United States Patent Office 3,085,973
Patented Apr. 16, 1963

3,085,973
SEPARATION OF THIOETHERS FROM HYDROCARBON OILS
Christopher P. Stark, Bartlesville, Okla., assignor to Phillips Petroleum Company, a corporation of Delaware
No Drawing. Filed Sept. 30, 1960, Ser. No. 59,512
8 Claims. (Cl. 208—226)

This invention relates to the process of separating thioethers from hydrocarbon oils.

The removal of sulfur and sulfur compounds from light petroleum distillates such as natural gasoline, refinery straight run and cracked gasolines, and the like, is of considerable importance in the refining of petroleum and is widely practiced. Sulfur compounds are particularly detrimental when present in motor fuels, for example, due to their corrosiveness and their tendency to reduce the lead susceptability of fuels such as gasoline. Further, the presence of sulfur compounds are very detrimental in feedstocks for various catalytic hydrocarbon conversion processes such as, for example, catalytic reforming operations, since the sulfur and sulfur compounds present in the feed, poison the catalyst and therefore, decrease the activity and useful life of the catalyst.

A conventional and economical method of removing sulfur compounds from light petroleum distillates and other hydrocarbon oils involves contacting the hydrocarbon oil with a caustic solution in what is commonly referred to as a washing step. This caustic washing step, however, will not extract thioethers from hydrocarbon oils. A conventional thioether removal process employs a molecular sieve to selectively extract said thioethers. This molecular sieve process is relatively expensive to operate in that the molecular sieve material is costly. It is, therefore, highly desirable that an economical thioether removal process be provided.

Accordingly, an object of this invention is to provide an improved process for the extraction of thioethers from hydrocarbon oils.

Other objects, advantages, and features of my invention will be readily apparent to those skilled in the art from the following description and the appended claims.

Broadly, I have discovered that the lower thioethers can be extracted from hydrocarbon oils by contacting said hydrocarbon oils with a sulfate compound. As hereinafter discussed, the term hydrocarbon oil refers to both vaporous and liquid hydrocarbons.

The inventive process is applicable to the extraction of the lower thioethers. These lower thioethers are defined as ranging from dimethyl sulfide, methyl-ethyl sulfide, diethyl sulfide, up to and including dibutyl sulfide. Although not intending to be limited thereto, for commercial purposes the process is particularly applicable to the extraction of the lower thioethers wherein the concentration of said thioethers is less than 100 p.p.m.

The sulfate compound utilized in the process, hereinafter referred to as an extraction process, is substantially anhydrous and is selected from the group consisting of calcium sulfate, barium sulfate, strontium sulfate, magnesium sulfate, zinc sulfate and cadmium sulfate.

In practicing the process, a hydrocarbon oil containing a lower thioether is passed through a bed of, for example, substantially anhydrous calcium sulfate. It is, of course, within the scope of this invention to employ other means of intimately contacting the sulfate compound and the hydrocarbon oil, such as circulating the sulfate compound and hydrocarbon oil together followed by a settling step. A temperature in the range of 32 to 300° F., preferably 50 to 100° F., is maintained in the contact zone. The hydrocarbon oils pass through the sulfate bed at a rate sufficient to maintain an hourly space velocity in the range of 1 to 15, preferably 5 to 10.

The extraction of lower thioethers from hydrocarbon oils by the disclosed process is apparently due to the adsorption of the thioethers by the calcium sulfate. The adsorbed thioethers can be removed from the calcium sulfate by heating the calcium sulfate to strip the thioethers from the sulfate and the calcium sulfate then returned to the contact zone. A preferred stripping temperature of 700–800° F. is employed. Neither the thioethers nor the calcium sulfate have been changed as a result of the adsorption or desorption operational steps.

The following example will serve to illustrate a specific application of my invention, and should not be construed as a limitation thereto.

Example 1

Normal butane of 99 volume percent purity was subjected to a caustic washing operation. The normal butane issuing from the caustic washing step contained 40 parts per million of dimethyl sulfide. This caustic washed butane was passed upwardly through a bed of calcined calcium sulfate at 200 p.s.i.g., 75° F. and at a liquid hourly space velocity of 5.0. A chromatographic analysis of the effluent product from the calcium sulfate bed disclosed 0.0 p.p.m. of dimethyl sulfide.

As will be evident to those skilled in the art, various modifications of this invention can be made, or followed, in the light of the foregoing disclosure and discussion, without departing from the spirit or scope thereof.

I claim:

1. A process for the removal of lower thioethers from hydrocarbon oils consisting of contacting a hydrocarbon oil containing a lower thioether in a contact zone with a substantially anhydrous sulfate compound selected from the group consisting of calcium sulfate, barium sulfate, strontium sulfate, magnesium sulfate, zinc sulfate and cadmium sulfate, and withdrawing from said contact zone a thioether-free hydrocarbon stream.

2. The process of claim 1 wherein the sulfate compound selected is calcium sulfate.

3. A process for the removal of lower thioethers from hydrocarbon oils consisting of contacting a hydrocarbon oil containing a lower thioether in a contact zone with a substantially anhydrous sulfate compound selected from the group consisting of calcium sulfate, barium sulfate, strontium sulfate, magnesium sulfate, zinc sulfate and cadmium sulfate, withdrawing from said contact zone a thioether-free hydrocarbon stream, withdrawing from said contact zone said sulfate compound containing said thioether, separating said thioether from said sulfate compound in a separation zone, and recycling said sulfate compound to said contact zone.

4. The process of claim 3 wherein the temperature of said separation zone is maintained in the range of 700–800° F.

5. A process for the removal of lower thioethers from hydrocarbon oils consisting of contacting a hydrocarbon oil containing a lower thioether in a contact zone with a substantially anhydrous sulfate compound selected from the group consisting of calcium sulfate, barium sulfate, strontium sulfate, magnesium sulfate, zinc sulfate and cadmium sulfate, maintaining a contact temperature in the range of 32 to 300° F., maintaining a contact hourly space velocity of 1 to 15, and withdrawing from said contact zone a thioether-free hydrocarbon stream.

6. The process of claim 5 wherein the sulfate compound selected is calcium sulfate.

7. The process of claim 5 wherein the contact temperature is in the range of 50 to 100° F. and the contact hourly space velocity is in the range of 5 to 10.

8. The process of claim 5 wherein said sulfate compound containing adsorbed said thioether is withdrawn from said contact zone and passed to a separation zone, maintaining the temperature of said separation zone in the range of 700–800° F., and recycling a thioether-free sulfate compound from said separation zone to said contact zone.

References Cited in the file of this patent

UNITED STATES PATENTS

| | | |
|---|---|---|
| 1,947,869 | Morrell et al. | Feb. 20, 1934 |
| 1,950,739 | Morrell | Mar. 13, 1934 |
| 1,954,488 | Morrell | Apr. 10, 1934 |
| 2,040,366 | Egloff et al. | May 12, 1936 |